United States Patent [19]

Bolon et al.

[11] 4,307,226

[45] Dec. 22, 1981

[54] SOLUBLE POLYESTERIMIDE RESINS

[75] Inventors: Donald A. Bolon, Scotia; Martin A. Byrne, Troy, both of N.Y.

[73] Assignee: General Electric Company, Schenectady, N.Y.

[21] Appl. No.: 150,241

[22] Filed: May 15, 1980

[51] Int. Cl.$^3$ .................. C08G 63/44; C08G 69/00
[52] U.S. Cl. .................................... 528/288; 525/437; 528/176; 528/183; 528/188; 528/292; 528/296
[58] Field of Search .............. 528/176, 183, 188, 288, 528/292, 296; 525/437

[56] References Cited

U.S. PATENT DOCUMENTS

| | | | |
|---|---|---|---|
| 3,426,098 | 2/1969 | Meyer et al. | 528/188 |
| 4,038,254 | 7/1977 | Schade et al. | 528/288 |
| 4,081,427 | 3/1978 | Lange | 528/288 |
| 4,119,608 | 10/1978 | Keating | 528/188 |
| 4,195,159 | 3/1980 | Kwiecinski | 528/288 |

*Primary Examiner*—Lucille M. Phynes
*Attorney, Agent, or Firm*—Joseph T. Cohen; James C. Davis, Jr.

[57] ABSTRACT

Interaction of ethylene glycol with a preformed polyesterimide resin at elevated temperatures forms mixtures homogeneous and clear at room temperature and also soluble in non-polluting solvents, such as monoethers of glycols.

15 Claims, No Drawings

SOLUBLE POLYESTERIMIDE RESINS

This invention is concerned with making polyesterimide (PESI) resins which are readily soluble at room temperature in non-polluting solvents, such as monoethers of glycol. More particularly the invention is concerned with a resinous composition comprising a preformed polyesterimide resin interacted with ethylene glycol at elevated temperatures, said composition being homogeneous and clear at room temperature, and soluble at room temperature in a monoether of a glycol, and methods for making such resinous compositions. The modified polyesterimides are useful as tough and durable wire insulation when applied either from a hot-melt or from solutions in the aforesaid monoethers of glycols.

The resins employed for insulating electrical conductors have in the past been conveniently applied in solution form. However, such applications have encountered a number of difficulties. Solvents used for making solutions of polyesterimide resins have become increasingly expensive and also add to cost of packaging, transporting, and storing solutions of the insulating resins. In addition, after application of the resinous solution to the electrical conductor, the time and energy required for removal of the solvent adversely affect the rate of throughput of the conductor in the apparatus used to coat the conductor. Furthermore, solvents used in the past for such resins, particularly cresol, have been subject to objection because of the polluting effect caused by the use of such solvents. Although application of polyesterimide resins from hot melts is known, and in fact has been used extensively, it would be desirable to continue to employ solutions of the polyesterimides because of the ease with which they can be applied; also the control of the viscosity of the resin is much easier with solvents thus permitting a more controlled thickness on the metallic conductor with reduction in problems associated with the unevenness of application to the conductor and possibility of deleterious bubble-formation in the insulation.

U.S. Pat. No. 4,081,427 attempts to address itself to some of the above problems by reformulating the polyester resins by increasing the relative proportions of hydroxy functionality of the resin during its preparation, by introducing increased amounts of a trihydroxy compound specifically tris(2-hydroxyethyl) isocyanurate (hereinafter referred to as "THEIC"). The THEIC used for the purpose is quite expensive and the excess generally does not interact with the resin so that eventually it requires removal, thus imposing problems of isolation and purification in order to avoid excess cost because of the use of the THEIC.

U.S. Pat. No. 4,038,254 issued July 26, 1977 attempts to circumvent the need for a polluting solvent while employing a complicated procedure for making polyesterimide resins. The practice of the invention described in this patent comprises a complex series of steps whereby incremental interaction of the ingredients used to make the polyester resin is employed. However, the process whereby one obtains the polyesterimide which can be applied from a melt to avoid the need for any polluting solvent is so complex and expensive that it does not lend itself readily to the requirements of present day application of insulation to electrical conductors.

Unexpectedly, we have discovered that we can make polyesterimide resins which are readily soluble, even at room temperatures, in non-polluting, inexpensive solvents, such as monoethers of glycol, e.g., the monomethylether of diethylene glycol. These polyesterimide resins are modified by the incorporation into the preformed polyesterimide resin of an effective amount of ethylene glycol using elevated temperatures for varying lengths of time depending on the amount of ethylene glycol, it is desired to incorporate. By means of a transesterification process, the ethylene glycol becomes part of the polyesterimide molecule thereby forming a polyesterimide resin which is now soluble in non-polluting solvents. According to our invention, such modified polyesterimide resins are prepared by (a) adding ethylene glycol to a preformed polyesterimide (which hereafter and in the appended claims is intended to be the definition for "preformed polyesterimide") formed by reacting under esterimide resin forming conditions a reaction mixture comprising:

(I) an imide-group-contributing component selected from the class consisting of
  (A) both (1) a diamine component and (2) an anhydride component including at least one (a) aromatic carboxylic acid anhydride containing at least one additional carboxylic group, said additional group being esterifiable and substantially nonimidizable, or (b) the corresponding acid thereof containing two imide-forming vicinal carboxylic groups in lieu of the anhydride group,
  (B) the carboxy functional polyimide reaction product of said diamine component and said anhydride component, and
  (C) mixtures of (A) above and (B) above;
(II) an ester-group-contributing component comprising
  (D) at least one dihydric alcohol containing two esterifiable hydroxyl groups,
  (E) at least one polyhydric alcohol containing at least three esterifiable hydroxyl groups,
  (F) at least one lower dialkyl ester of a phthalic acid component selected from the group consisting of terephthalic acid, isophthalic acid, and mixtures of said acids; and (b) heating the aforesaid reaction mixture with the ethylene glycol at a sufficiently elevated temperature and for an adequate period of time sufficient to incorporate the ethylene glycol into the polyesterimide resin by transesterification, so that upon cooling to room temperature, a clear, homogeneous resinous composition is obtained which is soluble in the aforesaid monoalkyl ether of a glycol.

By means of our claimed process for making the modified polyesterimide resins, one is able to obtain a resin which is more readily soluble in varying proportions even at room temperature in non-polluting solvents, particularly the aforesaid monomethylether of glycols.

Other preformed polyesterimides which are intended to be included within the definition for such resins are found disclosed in U.S. Pat. Nos. 3,426,098—Meyer et al. issued Feb. 4, 1969, and 4,119,608—Keating, issued Oct. 10, 1978. By reference, these patents, as well as other references and prior art defining polyesterimides, are intended to be included within the definition of "preformed polyesterimide resins".

In a preferred embodiment of our claimed process, the reaction mixture forming the preformed PESI resin is substantially free of solvents which react to form either imide groups or ester groups. In another preferred embodiment, the diamine component includes at least one aromatic diamine, and more preferably, no aliphatic diamine is present. In still another preferred embodiment, the process for making the preformed PESI includes the additional step of removing the resulting lower alcohol derived from the lower dialkyl ester. In yet another preferred embodiment, component I above is a mixture of a diamine and a trimellitic component selected from the group consisting of trimellitic acid, trimellitic anhydride and mixtures thereof; and reaction is continued until at least 50% of the theoretical amount of the lower alcohol derived from the lower dialkyl ester is formed and until at least 50% of the theoretical amount of water of esterification of the additional -COO-group of the trimellitic component is formed, preferably with removal of the lower alkyl alcohol and water of such esterification upon formation thereof.

The first step in preparing the preformed PESI resin is selection of the particular reactants and preparation of the reaction mixture thereof. As indicated above, the carboxyl functional polyimide contributing component can initially be formed separately and subsequently reacted with the polyester or ester-group-contributing component. Preferably, the PESI resin synthesis is effected by initially forming a reaction mixture wherein substantially all the ester-group forming and imide-group forming reactants are present in monomeric form. The balance of this detailed description is given principally with reference to this latter preferred reaction mode.

Thus the various ingredients initially may be added to any suitable reaction vessel, which may be formed of any suitable material such as, for example, glass stainless steel, or any other metal commonly employed in synthesizing polyesters, polyimides, and polyesterimides. It is desirable to heat the reactants to obtain a high molecular weight material but without causing gellation of the resulting resin. For resins intended for end use application from the molten state, in general the molecular weight (M.W.) preferably is in a range such that the melt viscosity is from about 300 cp to about 10,000 cp at a temperature of 150° C. For powder coating applications, the molecular weight preferably is in a range such that the melt viscosity is from about 1000 to about 5000 cp at 200° C. The reaction may be effected by heating the reactants preferably with stirring (after the mixture is heated to a stirrable state), from room temperature to a temperature of about 200° to 230° C. over a period of, for example, from about 2 to 6 hours. Since the lower dialkyl esters of the phthalic acids tend to sublime when heated too rapidly, it is desirable to provide means for condensing this sublimate while still allowing the liberated lower alcohols and water vapor (including water of imidization) to escape from the system. The use of saturated aliphatic monohydric alcohols such as decanol, for chain-stopping purposes, inhibits such sublimation. A condenser may be operated over the reaction vessel at a temperature suitable to condense the sublimate while allowing the gaseous water and lower alcohol to escape. After heating the reactants to the desired final temperature, the reaction may be stopped or the product may be maintained at the final temperature for another 2 to 4 hours to increase the molecular weight. When the product is maintained at this final temperature, it is necessary to stop the reaction before the resin reaches such a high molecular weight that gellation occurs.

Although the reaction may be terminated by pouring a suitable solvent into the hot ester imide polymer resin, the molten resin is preferably immediately poured or dumped from the reaction vessel and allowed to cool, e.g., to room temperature, without the addition of any solvent. This results in a brittle solid mass which may be ground into a powder if desired. The resin product is then eminently suitable for reaction with the ethylene glycol.

If desired an agent (e.g. xylene) can be included in the reaction mixture, typically at the start of the reaction, to aid in distilling the water and lower alcohols which are liberated. If such an agent is included, the xylene is distilled before completion of the polymer-forming reaction.

The diamine component may be almost any imide-forming diamine or a mixture of two or more such diamines in order to obtain the synthesis process advantages described above. Aromatic diamines are generally preferred. Suitable aromatic diamines include for example, 4,4'-methylene dianiline, 4,4'-oxydianiline, m-phenylene diamine, benzidine, 1,4-diaminonaphthalene, α,ω-nonamethylene diamine, xylene diamine, 3,3'-diaminodiphenyl, p-phenylene diamine, toluene diamine, 4,4'-diamino diphenylsulfone, 3,4'-diaminobenzophenone, etc. Suitable aliphatic diamines include for example, hexamethylene diamine, ethylene diamine, 4,4'-dicyclohexylmethane diamine, and the like. Additional diamines suitable herein are set forth in the above cited U.S. Pat. No. 4,119,608. In general, the preferred diamines are 4,4'-methylenedianiline (MDA) and 4,4'-oxydianiline (ODA).

The anhydride component may be almost any aromatic carboxylic acid anhydride containing at least one additional carboxylic group or the corresponding acid thereof containing two imide-forming vicinal carboxylic groups in lieu of the anhydride group. Mixtures thereof are also suitable. This applies as to the advantages achieved by the synthesis process as noted above. The additional carboxylic group must be esterifiable in order to link the polyimide with the polyester contributing portion of the ester imide resin and preferably is substantially nonimidizable. The anhydride component preferred herein is trimellitic acid or trimellitic anhydride (TMA) or mixtures thereof. Other anhydrides suitable herein, in some instances alone, but preferably in admixture with TMA, include for example, pyromellitic dianhydride, benzophenone-2,2',3,3'-tetracarboxylic dianhydride, 2,2-bis[4-(3,4-dicarboxyphenoxy) phenyl]propane dianhydride (hereinafter 4-BPADA), 2,2-bis[4-(2,3-dicarboxyphenoxy)phenyl]propane dianhydride (hereinafter 3-BPADA). The latter two compounds are described along with methods for preparation thereof in Heath and Wirth U.S. Pat. No. 3,972,902, incorporated herein by reference. Where included, such other suitable dianhydrides or the corresponding acids are preferably in addition to TMA or the corresponding tri-acid thereof. For best results in applications of the end product ester imide resins for use in coating electrical conductors, the total weight of such additional anhydrides or acids is limited to an amount corresponding to up to about 1.0 imide group formed therefrom per total moles of the TMA or tri-acid thereof.

The diamine and anhydride components are preferably included in such relative molar amounts that there are present from about 1.92 to about 2.08 imide-forming vicinal carbonyl groups (e.g. —C(=O)—O— of the vicinal acid groups) per amine group in the diamine component, and preferably two such —COO—groups per one amine group. In the case of anhydride functionality, the two vicinal —COO—groups would be condensed into one anhydride

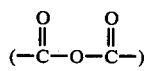

group. Thus, in the preferred embodiment of the imide-contributing component wherein TMA is the anhydride component, two moles of TMA would be included per mole of MDA to form a dicarboxy functional di-imide, the formula for which is shown in the above cited Meyer et al. patent U.S. Pat. No. 3,426,098, at column 2, line 20 thereof.

For use as insulating coatings on electrical conductors, the polyimide portion of the esterimide resin is preferably prepared using MDA as the diamine and TMA as the anhydride component.

The dihydric alcohol component used to make the preformed PESI may be almost any alcoholic diol containing two esterifiable hydroxyl groups in order to achieve the synthesis process advantages described above. Mixtures of suitable diols may also be included. Suitable diols for use herein include for example, ethylene glycol, propylene glycol, 1,4-butane diol, 1,5-pentane diol, neopentyl glycol, etc. Ethylene glycol is generally preferred for making the preformed PESI and results in generally better ultimately cured esterimide resins in end applications, e.g. as wire insulation.

The polyhydric alcohol component may be almost any polyhydric alcohol containing at least 3 esterifiable hydroxyl groups in order to provide the above described synthesis process advantages of this invention. Mixtures of such polyhydric alcohols may suitably be employed. Suitable polyhydric alcohols include, for example, tris(2-hydroxyethyl) isocyanurate (THEIC), glycerine, 1,1,1-trimethylolethane, 1,1,1-trimethylolpropane, mixtures thereof and the like. THEIC is generally preferred for improved coating properties, especially in wire enamel and other electrical conductor coating applications.

The lower dialkyl ester component of a phthalic acid may be almost any lower dialkyl ester of a phthalic acid selected from the group consisting of terephthalic acid, isophthalic acid, and mixtures thereof. These dialkyl esters may be, for example, the dimethyl, diethyl or dibutyl esters of such phthalic acids. The preferred lower dialkyl ester is dimethyl terephthalate (DMT).

The incorporation of monohydric alcoholic functionality (i.e. having an —OH group functionality of one) is usually helpful (for repressing sublimation of dimethyl terephthalate) as is more particularly disclosed and claimed in application Ser. No. 867,939, Boldebuck et al., filed Jan. 9, 1978 now U.S. Pat. No. 4,233,435, issued Nov. 11, 1980, and assigned to the same assignee as the present invention. Almost any monohydric alcohol having a boiling point at the pressure employed in the reaction of not less than the sublimation temperature of the lower dialkyl ester having the lowest sublimation temperature at the pressure employed, can be used for making the preformed PESI. A mixture of two or more such monohydric alcohols may be employed. Suitable monohydric alcohols include, for example, n-hexanol (B.P. 157° C.), 2-ethylhexanol (B.P. 183° C.), n-nonanol (B.P. 213° C.), n-decanol (B.P. 231° C.), n-dodecanol (B.P. 255° C.), 2-butyloctanol (B.P. 252° C.) tetradecanol (B.P. 264° C.), 2,6,8-trimethylnonane-4-ol (B.P. 225° C.), etc. Two or more monohydric alcohols may be included in the reaction mixture. The monohydric alcohol employed is preferably a saturated linear or branched monohydric alcohol having from 8 to 10 carbon atoms are preferred, while 1-decanol is generally the best monohydric alcohol.

The various components of the reaction mixture may be included in any suitable amounts. For better coating properties per 100 parts by total weight of components "a" through "e" below. (a) the diol is included in an amount from about 0.035 to about 0.250 mole, (b) the polyhydric alcohol is included in an amount from about 0.025 to 0.150 mole, (c) the lower dialkyl ester of a phthalic acid is included in an amount from about 0.030 to 0.180 mole, (d) the imide-forming anhydride component is included in an amount from about 0.100 to 0.200 mole, (e) the diamine component is included in an amount from about 0.050 to 0.100 mole, and (f) the organic compound containing monohydric alcohol functionality, if used in making the PESI, is included in an amount of from about 1.000 to 10.00 parts of the latter per 100 parts, by weight, of the total weight of the five components in (a) through (e) above; while the amount of the diamine component relative to the amount of the anhydride component is in the range set forth above and preferably about one equivalent of amine group per one equivalent of anhydride groups, and the ratio (defined below) of —OH groups to —COO— groups is more than one.

As used herein, the terms "mole" and "part-mole" of a component mean the weight in parts, e.g., grams, of the average molecular weight (M.W.) of the component in parts per part-mole (e.g., M.W. in grams per gram-mole).

The preformed ester imide resins produced herein are preferably hydroxyl-group terminated (unless chain-stopped) and accordingly the ratio of the total number of hydroxyl (—OH—) groups in the mono-, di-, and polyhydric alcohol components to the total number of esterforming carboxyl (—COO—) groups in the anhydride component and in the lower dialkyl esters is more than 1 —OH group per —COO— group. Preferably such ratio is from about 1.05 to about 2.5, and more preferably from about 1.1 to about 2.0, —OH groups per —COO— group. The —COO— groups included in the above ratios are the —COO—(lower alkyl) ester groups of the ester-group contributing phthalic acid component and the esterifiable substantially nonimide-forming —COO— group or groups, e.g. —COOH groups, of the anhydride component. Any carbonyl groups in the imide-forming anhydride groups or corresponding vicinal —COOH groups on the anhydride or corresponding acid are not included in the —COO— groups of the above —OH/—COO— group ratio.

As indicated above, the reaction mixture is preferably substantially free of solvents which may react to form imide groups and free of solvents which may react to form ester groups.

Preferably the diamine component includes at least one aromatic diamine and more preferably no aliphatic diamine is present in order to provide cured coatings having improved thermal properties.

In preparing the preformed PESI, the lower alcohol liberated upon transesterification of the lower dialkyl ester is preferably removed and more preferably in a continuous manner while it is being formed. The water of reaction is similarly preferably removed and more preferably in a continuous manner while it is being formed.

In a preferred process:
(a) the diamine component comprises a diamine selected from the group consisting of MDA; ODA and mixtures thereof (preferably MDA),
(b) the dianhydride component comprises (and preferably consists solely of) a member selected from the group consisting of TMA, trimellitic acid, and mixtures thereof (preferably TMA),
(c) that at least one dihydric alcohol comprises ethylene glycol (and preferably is ethylene glycol alone),
(d) that at least one polyhydric alcohol comprises THEIC (preferably as the sole polyhydric alcohol having an OH functionality of three), the lower dialkyl ester is a diester of terephthalic acid (preferably DMT), and the monohydric alcohol functionality (if used) is a linear, branched monohydric compound having a normal boiling point from about 150° C. to about 270° C. or a mixture of two or more of said compounds (preferably linear or branched $C_8$ to $C_{10}$ aliphatic alcohols or mixtures thereof).

A highly preferred reaction mixture comprises (a) from about 0.035 to about 0.250 mole of ethylene glycol (preferably about 0.11 to 0.15 mole), (b) from about 0.025 to about 0.150 mole of THEIC (preferably about 0.09 to 0.14 mole), (c) from about 0.030 to about 0.180 mole of DMT (preferably about 0.10 to 0.14 mole), (d) from about 0.100 to about 0.200 mole of TMA (preferably about 0.10 to 0.16 mole), (e) from about 0.050 to about 0.100 mole of MDA (preferably about 0.05 to 0.08 mole), and (f) from about 1.000 to about 10.00 parts of a monohydric alcohol having from 8 to 10 carbon atoms, wherein the amounts are per 100 parts by weight of the total weight of the five components in (a) through (e) above.

An alcoholysis catalyst is preferably employed in carrying out the ester imide forming reaction, especially the formation of the ester group contributing component. Almost any alcoholysis catalyst may be employed, such catalysts being well known in the art. Suitable catalysts include for example the titanate esters, e.g., tetrakis (2-ethyl hexyl) titanate, tetralkylene glycol titanate, di(triethanol amine) diisopropyl titanate and mixtures thereof; manganese soaps; lead oxide; dibutyl tin oxide; and the like. Tetrakis(2-ethylhexyl titanate is sometimes referred to as tetraoctyl titanate and is commercially available from the DuPont company as "TYZOR" TOT. Other suitable titanate catalysts include the tetra-R titanates where R represents alkyl groups such as for example isopropyl, methyl, butyl, hexyl and n-propyl. Other suitable catalysts include for example, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending upon the particular system being reacted. In general, the alcoholysis catalyst may be present in an amount of from about 0.01 to about 5% by weight based on the total weight of the reactants. Higher concentrations of the catalyst may be employed but no advantage is gained by such use. Preferably the catalyst is tetraoctyltitanate, employed in an amount of about 0.015% by weight of titanium on the foregoing weight basis.

In the above preferred reaction mixtures, it may be desirable to include 3-BPADA, 4-BPADA, or mixtures thereof (preferably 4-BPADA) with TMA in the anhydride component for further improvement in protective coating properties, especially from the standpoint of insulating coatings on electrical conductors, e.g. magnet wire.

The amount of ethylene glycol which is thermally incorporated into the preformed PESI can be varied within fairly wide limits. Based on the weight of the preformed PESI (exclusive of any solvent which may be present) we can employ from about 2 to 10% or more of ethylene glycol. Since the ethylene glycol is introduced into the PESI molecule by transesterification, amounts in excess of 10 weight percent normally offer no advantage and may be disadvantageous in causing physical changes in the preformed resin which may be undesirable for coating purposes.

The temperature at which ethylene glycol is introduced into the preformed PESI is important and will depend to a considerable extent on the amount of ethylene glycol which is being interacted. It was found when amounts of ethylene glycol greater than 3 weight percent were mixed into the hot melted resin and then the resin cooled, the resin phase separated from ethylene glycol and became opaque and inhomogeneous, therefore, rendering it useless for conductor coating purposes. We also found that as the concentration of ethylene glycol was increased under the above conditions, the phase separation occurred even at temperatures above room temperatures until when adding concentrations of 30 weight percent ethylene glycol was used, the separation was even obvious at about 150° C.

We have unexpectedly found, however, that when the preformed PESI resin containing the ethylene glycol is maintained at an elevated temperature for a sufficiently long time, e.g., 1 to 8 hours at a temperature of 150° C. to 200° C. for a period of time that varies with the amount of glycol added, the solution does not phase separate as it cools, but rather remains as a clear solution. Examination of the resin under such conditions reveals that the ethylene glycol has been incorporated as an integral part of the preformed PESI. This was a surprising discovery, since usually transesterification normally proceeds at a much slower rate and requires much higher temperatures during the original polymer preparation. In addition to the elimination of the phase separation upon cooling, the resin obtained in accordance with our process has a property which is unlike the preformed polyesterimides made in the usual fashion, namely, that it is now soluble at room temperature in a variety of non-polluting solvents, particularly the more desirable monomethylether of diethylene glycol or the monophenylether of ethylene glycol and remains soluble even at 30% solids. It is even possible to prepare solutions of these resins in such ether glycols as high as 60% solids without heating the solution. By dissolving the resins at room temperature, the monoethers of the ethylene glycols act as solvents and do not become incorporated into the resin.

The resin prepared by our process can be dissolved in the monomethyl ether of ethylene glycol and applied to copper wire using currently available application techniques. The applied insulation when cured has acceptable physical and electrical properties. In addition, the resin prepared by the incorporation of ethylene glycol can be made with a low enough melting point so it can also be applied to copper wire in a standard hot melt applicator to yield a polyesterimide wire insulation which has all the needed properties such as flexibility, adhesion, and thermal properties, well within the specifications established by the wire industry.

In the practice of our invention, the temperature at which the ethylene glycol is incorporated is usually higher at the higher concentration of ethylene glycol than at the lower concentrations. Thus, when 5%, by weight, ethylene glycol is incorporated, heating at temperatures of about 150°-160° C. for periods of time (with stirring) from about 1-4 hours are adequate for incorporation and attainment of the desirable characteristics of the modified PESI. As the concentration of the ethylene glycol increases, for instance up to about 10% by weight, higher temperatures of the order of about 200°-225° C. for somewhat longer periods of time (about 5-8 hours) are usually required to obtain a modified PESI which when cooled to room temperature is clear and homogeneous and is soluble in the non-polluting solvents even at room temperature. Care should be exercised within the above parameters that heating is conducted for a sufficient length of time at the elevated temperatures; otherwise phase separation will occur, if not immediately, certainly within a few hours. A properly prepared reaction product dissolved in the monomethyl ether of diethylene glycol will remain clear and homogeneous indefinitely at room temperature.

It should be noted that even if one should try to add more ethylene glycol at the beginning of the polymerization when the preformed PESI is prepared, numerous problems are encountered. Thus, if an excess of ethylene glycol is added at the beginning of the polymerization step, what usually will happen is that the excess ethylene glycol will begin to distill as the resin temperature climbs past 200° C. This means that the viscosity of the resin is changing rapidly which is an undesirable characteristic. If an attempt is made to prematurely stop the heating to avoid this problem, an insoluble polymer is often the result wherein such polymer phase separates upon cooling the resin mixture. Continuing to heat the mixture of ingredients for too long a time results in a polymer which has too high a viscosity, for instance, about 5000 cps when measured at 150° C. with a spindle viscometer.

In order that those skilled in the art may better understand how the present invention can be practiced, the following examples are given by way of illustration and not by way of limitation. Unless otherwise indicated, all parts are by weight.

EXAMPLE 1

Into a resin kettle equipped with stirrer, heating mantle equipped with an electrical temperature control, Dean and Stark trap, and a condenser fitted with a nitrogen bypass for maintaining a nitrogen blanket over the reaction system, was charged 384 grams (2.31 moles) terephthalic acid, 586 grams (2.25 moles) tris-(2-hydroxyethyl)isocyanurate (THEIC), 305 grams (1.54 moles) methylene dianiline, 591 grams (3.08 moles) trimellitic anhydride, 391 grams (6.31 moles) ethylene glycol, and tetrakis (2-ethylhexyl) titanate (1.9 grams, 0.0034 mole). The kettle was heated rapidly to an internal temperature of about 175° C. at which time a solid was formed. As the crust of the solid broke up with stirring, the water of reaction began to distill through the condenser. After approximately 7 hours, the temperature had risen to 210° C., the resin turned clear and 179 grams of water had distilled. At this point 122 grams (1.97 moles) additional ethylene glycol was added to the hot resin which was then allowed to stir for one hour at about 150° C. during which no further distillate was collected. The resin was poured from the kettle and had a viscosity of 560 cps at 150° C. measured with a spindle viscometer. The resin thus obtained could be dissolved at 20, 30, 40, 50, and 60% solids while cold, in the monomethyl ether of diethylene glycol to form homogeneous, clear solutions suitable for wire enameling. It was also possible to apply this modified polyesterimide resin to wire as a solventless resin (hot melt) by using a heated applicator which maintained the viscosity of the resin at a usable level.

EXAMPLE 2

The above-described kettle described in Example 1 was charged with 195 grams (3.15 moles) ethylene glycol, 586 grams (2.25 moles) of THEIC, 448 grams (2.31 moles) dimethyl terephthalate, 305 grams (1.54 moles) methylene dianiline, 590 grams (3.07 moles) trimellitic anhydride, 19 grams (0.12 moles) decyl alcohol, and 1.7 grams (0.003 mole) tetrakis (2-ethylhexyl) titanate. The decyl alcohol used in this example was a chain stopper, as is more particularly disclosed and claimed in the copending application Ser. No. 867,939, filed Jan. 9, 1978 (hereby incorporated by reference) of Boldebuck et al assigned to the same assignee as the present invention, now U.S. Pat. No. 4,233,435, issued Nov. 11, 1980, and used for repressing dimethyl terephthalate sublimation and for increasing the storage stability of the polyesterimide. The temperature of the mixture was raised to 150° C. when water and methanol began to distill. After 6.5 hours, the temperature had risen to 219° C. and 204 grams of distillate (79%) had been collected. The material was cooled to 170° C. and thereafter 209 grams ethylene glycol was added to the resin. After 30 minutes of stirring at 150° C. the material was cooled to yield a homogeneous, clear resin which was soluble in the monomethyl ether of diethylene glycol in most proportions and suitable for coating on wire.

EXAMPLE 3

When Example 2 was repeated with the exception that 391 grams (6.3 moles) of ethylene glycol was used at the beginning of the reaction (to take the place of ethylene glycol required to make the preformed polyesterimide and also to take care of the additional ethylene glycol added in Example 2 after polyesterimide formation). The reaction mixture was heated as in Example 2 until 98% of the theoretical distillate of methanol and water (253 grams) was collected. It was found that when this resin was cooled, it had a viscosity of 430 cps at 150° C. However, in contrast to the ability of the resin prepared in Example 2 to be soluble in the monomethyl ether of diethylene glycol in most concentrations the resin prepared in this example could not be dissolved in the same monomethyl ether of diethylene glycol.

EXAMPLE 4

To a reaction vessel similar to that in Example 1, were charged 93 grams (1.5 moles) of ethylene glycol, 279 grams (1.07 moles) THEIC, 213 grams (1.1 moles) dimethyl terephthalate, 145 grams (0.73 mole) methylene dianiline, and 282 grams (1.47 moles of trimellitic anhydride. The temperature of the reaction mass was raised to 145° C., at which point distillate began to appear. After 8 hours, the temperature had risen to 226° C. and 103 grams of distillate had been collected. A sample of this resin weighing 83 grams was separated and combined with 13 grams of ethylene glycol and 0.1 gram of titanium acetylacetonate, which is a transesterification catalyst. After 24 hours stirring at 150° C., the resin was cooled and found to have a viscosity of 1000 cps at 150° C. This resin again was soluble in almost all proportions in the monomethyl ether of diethylene glycol.

EXAMPLE 5

To a reaction vessel similar to that used in Example 1 were placed 223 grams (3.6 moles) ethylene glycol, 335 grams (1.28 moles) THEIC, 219 grams (1.32 moles) terephthalic acid, 174 grams (0.88 mole) methylene dianiline, 337 grams (1.76 moles) trimellitic anhydride, 12 grams (0.076 mole) decyl alcohol and 1.06 grams (0.0019 mole) tetrakis (2-ethylhexyl) titanate. The contents were heated with stirring at 160° C. and distillation of water began. The temperature was raised to 215° C. during 5 hours at which point 110 grams of distillate was collected. Thereafter, 62 grams (1.0 mole) of additional ethylene glycol was added and heated with the resin for 1 hour at a temperature of 150° C., at which point the resin was then cooled. The resin had a viscosity of 604 cps at 150° C. As was true in the other comparable examples, this resin was soluble at 30% solids in the monomethyl ether of diethylene glycol.

EXAMPLE 6

A modified polyesterimide resin was prepared similarly as in Example 2, except that the resin was cooled when all the distillate had been collected, but before the additional ethylene glycol was added. Samples of this resin were mixed with 5, 10, and 15%, by weight, ethylene glycol at 150° C. After heating for 0.5 hours, the 5% sample remained clear upon cooling, the 10% sample required 3 hours heating at 150° C. in order to attain a clear solution on cooling without separation of the ethylene glycol, and the 15% sample required 5 hours heating at 150° C. to prevent phase separation when the resin was cooled.

EXAMPLE 7

To the above-described reaction vessel were added 93.00 grams (1.5 mole) ethylene glycol, 301.62 grams (1.156 moles) THEIC, 257.63 grams (1.328 moles) dimethyl terephthalate, 114.05 grams (0.576 mole) methylene dianiline, 221.95 grams (1.155 moles) TMA. When the reaction mixture became semi-molten (at a temperature of about 80°–100° C.) stirring was started. After heating for about 0.5 hour, the temperature of the reaction mixture had increased to 120° C. After a total of about 0.6 hour, the temperature had increased to 140° C. at which time it became necessary to apply heat from a heat gun to the accumulated sublimate of dimethyl terephthalate to re-melt the same and permit the molten sublimate to return to the reaction mixture. After a total heating time of about 1.25 hours (reaction temperature of 205° C.), 0.88 gram of the aforementioned titanate catalyst used previously was added and stirred in. At a total heating time of 1.75 hours and a mixture temperature of 221° C., the reaction mixture became clear and homogeneous. The temperature was maintained at about 220° to about 225° C. until the total heating time was about 2.7 hours, during which time a total of 98 grams of condensed distillate was collected (representing 93% of the theoretical total amount of water of imidization, water of esterification, and methanol which would be liberated upon complete reaction of all the ingredients). After a total of 3.5 hours of heating at about 225° C., the reaction was stopped with no additional distillate having been collected during the final 0.8 hour. This resin had a viscosity of 3000 cps at 150° C. The resin was cooled to 150° C. and 40 grams (0.65 mole) additional ethylene glycol was mixed in thoroughly. When a sample of this mixture was cooled to room temperature, phase separation occurred. However, upon heating the mixture at 150° C. for about 1 hour, in addition to the viscosity being reduced to 800 cps, it was also found that upon cooling the resin remained clear and homogeneous indefinitely. This illustrates the advantages of incorporating the ethylene glycol in a preformed PESI, namely, that the viscosity of the preformed PESI can be significantly reduced and this desirable result can be achieved while still being able to obtain a clear, homogeneous resin free of phase separation at room temperature. Such lower viscosities are important in applying the resin from a melt to electrical conductors, and also to be able to dissolve such low viscosity resins in non-polluting solvents to obtain homogeneous solutions of said resin where it is desired to use such solutions for coating purposes.

It will of course be understood by those skilled in the art that in addition to the various ingredients and conditions employed in the foregoing examples as well as proportion of ingredients, other ingredients, conditions and proportions may be employed, many examples of which have been described previously, without departing from the scope of the invention. The polyesterimide resins prepared by means of the instant invention can be characterized that they can be fused to useful and bubble-free film through the use of external mechanical pressure at temperatures between 200°–250° C. Solutions of these ethylene glycol modified polyesterimides can be made by incorporation in non-polluting solvents, such as the ether glycols, to avoid the use of solvents which have now become hazardous and considered unsuitable for environmental reasons, such as cresol.

What we claim as new and desire to secure by Letters Patent of the United States is:

1. A process for preparing a polyesterimide resin which is soluble in non-polluting solvents, such as monoalkyl ethers of a glycol which process comprises:
 (a) adding ethylene glycol to a preformed polyesterimide formed by reacting under esterimide resin forming conditions a reaction mixture comprising:
   (I) an imide-group-contributing component selected from the class consisting of
     (A) both (1) a diamine component and (2) an anhydride component including at least one (a) aromatic carboxylic acid anhydride containing at least one additional carboxylic group, said additional group being esterifiable and substantially non-imidizable, or (b) the corresponding acid thereof containing two imide-forming vicinal carboxylic groups in lieu of the anhydride group,
     (B) the carboxy functional polyimide reaction product of said diamine component and said anhydride component, and
     (C) mixtures of (A) above and (B) above;
   (II) an ester-group-contributing component comprising (D) at least one dihydric alcohol containing two esterifiable hydroxyl groups, (E) at least one polyhydric alcohol containing at least three esterifiable hydroxyl groups, (F) at least one lower dialkyl ester of a phthalic acid component selected from the group consisting of terephthalic acid, isophthalic acid, and mixtures of said acids;

and (b) heating the mixture of ingredients in (a) at an elevated temperature and for a period of time sufficient to incorporate the ethylene glycol into the polyesterimide resin by transesterification, so that upon cooling to room temperature, a clear, homogeneous resinous composition is obtained which is soluble in the aforesaid monoether of a glycol.

2. The process of claim 1 wherein the diamine component includes at least one aromatic diamine.

3. The process of claim 2 further including the step of removing both the resulting lower alcohol derived from the lower dialkyl ester, and the liberated water of reaction.

4. The process of claim 1 wherein component I above is a mixture of an aromatic diamine and a trimellitic component selected from the group consisting of trimellitic acid, trimellitic anhydride and mixtures thereof; and reaction is continued until at least 50% of the theoretical amount of the lower alcohol derived from the lower dialkyl ester is formed and until at least 50% of the theoretical amount of water of esterificatin of the additional —COO— group of the trimellitic compound is formed.

5. The process of claim 1 wherein the ratio of the total number of hydroxyl (—OH) groups in the mono-, di-, and polyhydric alcohols to the total number of ester-forming carboxyl (—COO—) groups in (a) the anhydride component and (b) the lower dialkyl ester is more than one —OH group per —COO— group.

6. The process of claim 5 wherein said ratio is from about 1.05 to about 2.5 —OH groups per —COO— group.

7. The process of claim 1 wherein said
(a) diamine component comprises a diamine selected from the group consisting of 4,4'-methylene dianiline, 4,4'-oxydianiline, and mixtures thereof,
(b) said anhydride component comprises a member selected from the group consisting of trimellitic acid, trimellitic anhydride and mixtures thereof,
(c) said dihydric alcohol comprises ethylene glycol
(d) said polyhydric alcohol is tris(2-hydroxyethyl) isocyanurate, and
(e) said lower dialkyl ester is the dimethyl ester of terephthalic acid.

8. The process of claim 1 wherein the ethylene glycol comprises, by weight, from 2 to 10%, based on the weight of the preformed polyesterimide.

9. The process as in claim 1 wherein a saturated aliphatic monohydric alcohol is selected from the group consisting of n-hexanol, 2-ethylhexanol, n-nonanol, n-decanol, n-dodecanol, 2-butyloctanol, tetradecanol, 2,6,8-trimethylnonane-4-ol, and mixtures thereof, is used in making the preformed polyesterimide.

10. The process of claim 1 wherein the reaction mixture used to make the preformed polyesterimide comprises on a molar ratio (a) from about 0.035 to 0.250 mole of ethylene glycol, (b) from about 0.025 to 0.150 mole of tris(2-hydroxyethyl) isocyanurate, (c) from about 0.030 to about 0.18 mole of dimethyl terephthalate, (D) from about 0.10 to 0.20 mole trimellitic acid, trimellitic anhydride or mixtures thereof, (e) from about 0.050 to 0.100 mole of diamine selected from the group consisting of 4,4'-methylene dianiline, 4,4'-oxydianiline, and mixtures thereof, and (f) from about 1.00 to about 20.00 parts of a saturated aliphatic monohydric alcohol having from 8 to 10 carbon atoms, said amounts being per 100 parts, by weight, of the total weight of the five components (a) through (e).

11. The process of claim 1 wherein the anhydride component comprises a trimellitic compound selected from the group consisting of trimellitic acid, trimellitic anhydride, and mixtures thereof, and a member selected from the group consisting of 2,2-bis[4-(2,3-dicarboxyphenoxy)phenyl] propane dianhydride, and 2,2-bis[4-(3,4-dicarboxyphenoxy)phenyl] propane dianhydride, the corresponding tetra-acids thereof, and mixtures thereof.

12. A resinous composition comprising a preformed polyesterimide resin interacted with 2 to 10%, by weight, thereof ethylene glycol at elevated temperatures, said composition being homogeneous and clear at room temperature, and soluble at room temperature in a monoalkyl ether of a glycol.

13. A resinous composition comprising a preformed polyesterimide resin interacted with 2 to 10%, by weight, thereof ethylene glycol at elevated temperatures, said composition being homogeneous and clear at room temperature and soluble at room temperature in a monoalkyl ether of a glycol, wherein the preformed polyesterimide is the product of reaction of a mixture of ingredients comprising (I) an imide-group-contributing component selected from the class consisting of
(A) both (1) a diamine component and (2) an anhydride component including at least one (a) aromatic carboxylic acid anhydride containing at least one additional carboxylic group, said additional group being esterifiable and substantially non-imidizable, or (b) the corresponding acid thereof containing two imide-forming vicinal carboxylic groups in lieu of the anhydride group,
(B) the carboxy functional polyimide reaction product of said diamine component and said anhydride component, and
(C) mixtures of (A) above and (B) above;

(II) an ester-group-contributing component comprising
(D) at least one dihydric alcohol containing two esterifiable hydroxyl groups,
(E) at least one polyhydric alcohol containing at least three esterifiable hydroxyl groups,
(F) at least one lower dialkyl ester of a phthalic acid component selected from the group consisting of terephthalic acid, isophthalic acid, and mixtures of said acids.

14. The resinous product of claim 13 prepared in accordance with the process of claim 7.

15. The product of claim 13 prepared in accordance with the process of claim 10.

* * * * *